US012575005B1

(12) United States Patent
Stukas et al.

(10) Patent No.: US 12,575,005 B1
(45) Date of Patent: Mar. 10, 2026

(54) MELTING REGOLITH BY ELECTRODES

(71) Applicants: Kaylee Paige Stukas, Redondo Beach, CA (US); Kevin Michael Cannon, Los Angeles, CA (US)

(72) Inventors: Kaylee Paige Stukas, Redondo Beach, CA (US); Kevin Michael Cannon, Los Angeles, CA (US)

( * ) Notice: Subject to any disclaimer, the term of this patent is extended or adjusted under 35 U.S.C. 154(b) by 0 days.

(21) Appl. No.: 19/227,397

(22) Filed: Jun. 3, 2025

(51) Int. Cl.

| | |
|---|---|
| ***H05B 3/00*** | (2006.01) |
| ***H05B 3/03*** | (2006.01) |
| ***H05B 3/46*** | (2006.01) |

(52) U.S. Cl.
CPC ............ *H05B 3/0004* (2013.01); *H05B 3/03* (2013.01); *H05B 3/46* (2013.01)

(58) Field of Classification Search
CPC .......... H05B 3/0004; H05B 3/03; H05B 3/46; E21B 7/15; E21B 43/24; E21C 51/00
USPC ........................................ 219/50; 175/11, 15
See application file for complete search history.

(56) References Cited

U.S. PATENT DOCUMENTS

| | | | | |
|---|---|---|---|---|
| 2023/0124575 | A1* | 4/2023 | Moeny | E21B 10/60 175/16 |
| 2024/0247455 | A1* | 7/2024 | Guru | G01N 21/21 |
| 2024/0344402 | A1* | 10/2024 | Merkel | E21B 7/15 |
| 2025/0084553 | A1* | 3/2025 | Carol | C25B 9/30 |
| 2025/0154042 | A1* | 5/2025 | Yan | C03B 5/2353 |

* cited by examiner

*Primary Examiner* — Helena Kosanovic
*Assistant Examiner* — Yeong Juen Thong
(74) *Attorney, Agent, or Firm* — Outer Space IP

(57) ABSTRACT

Methods, systems, and devices are disclosed for melting regolith. Electrodes with resistive heaters, an outer shell, and an insulative barrier between them mounted on a gantry are used. The resistive heater initially melts the regolith. The outer shells then have electricity conducted between them to induce ohmic heating of the molten regolith. The electrodes are then advanced by the gantry through the molten regolith to melt the regolith at the edge of the molten pool.

19 Claims, 10 Drawing Sheets

MELTING REGOLITH BY ELECTRODES

TECHNICAL FIELD

The devices, systems, and methods described herein relate generally to in situ resource utilization on Earth and in outer space. More particularly, the devices, systems, and methods described herein relate to regolith modification.

BACKGROUND OF THE INVENTION

The ability to modify regolith in remote locations is a long-standing issue. NASA has had multiple challenges directed at modification of lunar regolith, specifically for dust mitigation. Regolith exists on every rocky body in the solar system.

SUMMARY OF THE INVENTION

In one example, the disclosure provides a device for melting regolith. A first electrode is configured to melt regolith and conducting electricity. The first electrode includes a resistive heater configured to heat the first electrode, an outer shell configured to conduct heat and electricity, and an intermediate insulative barrier between the resistive heater and the outer shell configured to insulate the outer shell and the resistive heater electrically. A second electrode is configured to conduct electricity. A gantry is configured to hold the first and second electrodes, lowering the first and second electrodes into the regolith, and advancing the first and second electrodes through the regolith. The first and second electrodes are configured to conduct electricity through molten regolith.

In some examples, the second electrode is further configured to melting regolith and the second electrode further includes a second resistive heater configured to heat the second electrode, a second outer shell configured to conduct heat and electricity, and a second intermediate insulative barrier between the second resistive heater and the second outer shell configured to insulate the second outer shell and the second resistive heater electrically.

In some examples, the outer shell is made of a material selected from the group consisting of molybdenum, niobium, hafnium, tantalum, tungsten, Inconel, graphite, zirconium, chromium, silicon carbide, molybdenum disilicide, zirconium dioxide, boron nitride, aluminum oxide, silicon nitride, hafnium carbide, zirconium carbide, zirconium diboride, nickel-based superalloys, ceramic matrix composites, and combinations thereof.

In some examples, the device includes a horizontal bar configured to smoothing the molten regolith.

In some examples, the outer electrode consists of a horizontal cross-section of a blade and the outer electrode is configured to press against and penetrating the regolith while creating the molten regolith.

In some examples, the intermediate insulative barrier is selected from the group consisting of magnesium oxide, aluminum oxide, beryllium oxide, thorium oxide, calcium oxide, strontium oxide, chromium oxide, zinc oxide, barium oxide, cobalt oxide, indium oxide, titanium dioxide, manganese oxide, zirconium dioxide, diamond, graphite, boron nitride, vacuum, a powder, a sintered solid, and combinations thereof.

In some examples, the resistive heater is made of a material selected from the group consisting of tungsten, tantalum, hafnium, niobium, molybdenum, titanium-zirconium-molybdenum (TZM) alloy, tungsten-rhenium alloy, molybdenum disilicide, and combinations thereof.

In some examples, the resistive heater wraps around an insulative core, and the core is made of a material selected from the group consisting of aluminum oxide, mullite, corundum, mullite-bonded silicon carbide, nitride bonded silicon carbide, magnesium oxide, silicon carbide, graphite, beryllium oxide, calcium oxide, boron nitride, zirconium dioxide, titanium nitride, and combinations thereof.

In one example, a system for melting regolith is disclosed. A first electrode is configured to melt regolith and conduct electricity. The first electrode includes a first electrode to melt regolith and conduct electricity. The first electrode consists of a resistive heater to heat the first electrode, an outer shell to conduct heat and electricity, and an intermediate insulative barrier between the resistive heater and the outer shell to insulate the outer shell and the resistive heater electrically. A second electrode is configured to conduct electricity. A gantry is configured to traverse terrain, the terrain consisting of the regolith, and the gantry further configured to carry the first electrode and the second electrode, insert and remove the first and second electrodes into the regolith to melt the regolith, and to traverse with the first and second electrodes through the melted regolith. The first and second electrodes are configured to conduct electricity through the melted regolith.

In some examples, the second electrode is further configured to melt the regolith and consists of a second resistive heater to heat the second electrode, a second outer shell to conduct heat and electricity, and a second intermediate insulative barrier between the second resistive heater and the second outer shell to insulate the second outer shell and the resistive heater electrically.

In some examples, the gantry is mounted to a rover and the rover drags the gantry across the terrain.

In some examples, the terrain is selected from the group consisting of the Earth, Moon, Mars, an asteroid, a comet, and another outer space object.

In one example, a method for melting regolith is disclosed. A first electrode is provided consisting of a resistive heater, an outer shell, and an intermediate insulative barrier between the resistive heater and the outer shell, the intermediate insulative barrier insulating the outer shell and the resistive heater electrically. At least a first electrode is heated by the resistive heater and inserting the first electrode into a regolith. A portion of the regolith is melted with the first electrode, creating a molten pool. A second electrode is inserted into the molten pool and conducts electricity from the outer shell of the first electrode through the molten pool and through the second electrode. The first and the second electrodes advance towards an edge of the molten pool and melt a further portion of the regolith.

In some examples, the method includes melting a portion of the regolith with the second electrode. The second electrode consists of a second resistive heater heating the second electrode, a second outer shell conducting heat and electricity, and a second intermediate insulative barrier between the second resistive heater and the second outer shell insulating the second outer shell and the second resistive heater electrically.

In some examples, upon conducting electricity from the first electrode through the molten pool and through the second electrode, heating of the first electrode by the resistive heater is disengaged.

In some examples, the method includes reengaging heating of the first electrode by the resistive heater before removing the first electrode from the molten pool.

In some examples, the electricity is alternating current.

In some examples, the electricity is direct current, and the method further includes reacting the regolith electrolytically by the direct current to produce oxygen.

In some examples, the method includes directing the molten pool to propagate to create a road, a landing pad, or a foundation.

Further aspects and embodiments are provided in the foregoing drawings, detailed description and claims.

BRIEF DESCRIPTION OF DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
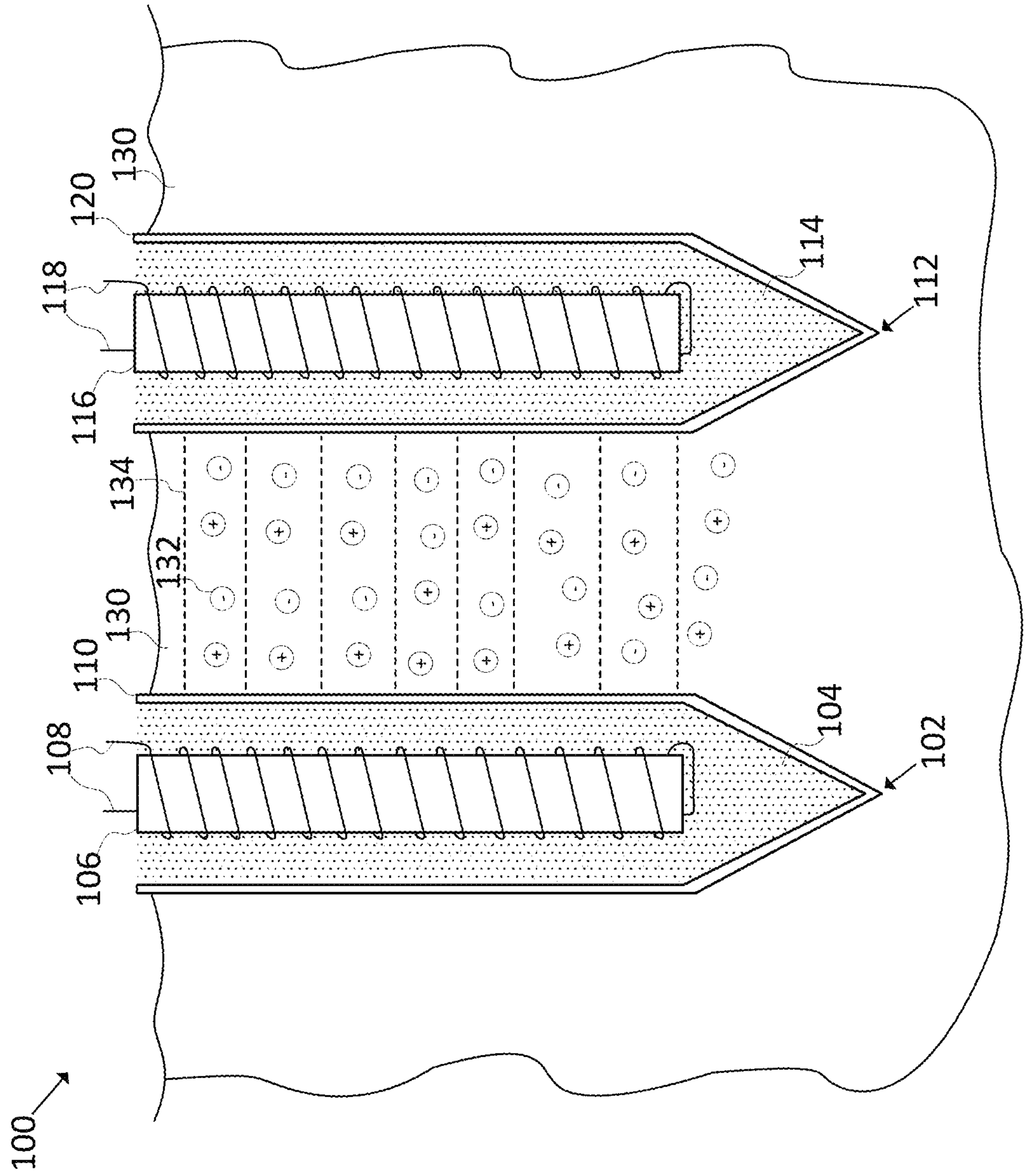
FIG. 1 is a cross-sectional view of a pair of electrodes.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "about" means within +10% of the stated value, e.g., within +5% of the stated value, or within +2% of the stated value.

As used herein, "regolith" refers to unconsolidated, loose, heterogeneous superficial deposits including dust, broken rocks, and other related materials present on Earth, the Moon, Mars, other rocky bodies, some asteroids and even some comets.

As space exploration progresses to extended missions on the Moon, constructing launching pads is essential for facilitating sustainable lunar operations. Factors, such as the lack of atmosphere to break descent and the sloped, cratered lunar surface, complicate the spacecraft lunar landing process, often promoting spacecraft to topple over on landing. Providing a flat lunar surface would allow smoother landings and take-offs, thereby facilitating sustainable lunar transportation.

One challenge for constructing lunar launching pads is the thick layer of regolith covering the moon surface. Being 4-5 meters thick in mare regions and 10-15 meters in highland areas of the Moon, regolith contains all sizes of material from large boulders to sub-micron dust particles. The changing geotechnical properties of the lunar regolith obstructs the ability to shape the lunar surface to a smooth launching pad. Accordingly there is need for systems and methods that treat regolith to effectively form a flat, smooth surface suitable for spacecraft landing and launching.

The present disclosure presents systems and methods for heating regolith to form a molten pool that can be graded to form a flat surface suitable for spacecraft landing and launching. The disclosed systems can include a self-propelled vehicle and a device coupled to the vehicle such that the device traverses terrain as the vehicle propels forward. The device includes a first electrode and a second electrode configured to generate and apply heat to the regolith to form a molten pool. The first and second electrodes are also configured to conduct current through the molten pool of regolith such that the current is converted to heat the molten pool of regolith. The device includes a gantry configured to hold the first and second electrodes in a predetermined spatial arrangement and configured to advance the first and second electrodes downward through the depth of the regolith to expand the molten pool of regolith.

FIG. 1 illustrates a device 100 for melting regolith 101 according to one example of the present disclosure. Device 100 is configured to melt regolith 101 into a molten pool 130 such that molten pool 130 of regolith can be graded or leveled before solidifying. Device 100 can include one or more electrodes configured to penetrate the regolith and generate heat to melt the surrounding regolith. For example, as shown in FIG. 1, device 100 can include a first electrode 102 and a second electrode 112. First electrode 102 and second electrode 112 can apply different heat treatments sequentially or simultaneously to the surrounding regolith 101 to form molten pool 130. For example, first electrode 102 and second electrode 112 can operate independently, for example by each electrode using an electrical resistive heater, to apply heat to the surrounding regolith 101. First electrode 102 and second electrode 112 can operate cooperatively, for example through electrical communication, to conduct electrical current 134 through the surrounding regolith 101, which is converted to heat (ohmic heating) applied to the surrounding regolith 101. First electrode 102 and second electrode 112 can use other forms of heat sources to generate and apply heat to the surrounding regolith 101, such as for example, plasma arcs, lasers, solar concentrators, electric induction, microwave radiation, thermite, and capacitive heating.

As shown in FIG. 1, according to one example, first electrode 102 can include an outer conductive shell 110 and a resistive heater 105 disposed in a cavity 103 defined by outer conductive shell 110. Outer conductive shell 110 can be electrically conductive to facilitate the flow of electrical current 134 through the surrounding regolith 101 to an adjacent electrode (e.g., second electrode 112), thereby serving as an electrical conductive interface for an ohmic heating operation. Outer shell 110 can be thermally conductive, as well, to transfer heat generated by resistive heater 105 to the surrounding regolith 101. In some aspects, outer conductive shell 110 can be formed of a material selected from the group consisting of Molybdenum, Niobium, Hafnium, Tantalum, Tungsten, Inconel, Graphite, Zirconium, Chromium, Silicon carbide, Molybdenum disilicide, Zirconium dioxide, Boron nitride, Aluminum oxide, Silicon nitride, Hafnium carbide, Zirconium carbide, Zirconium diboride, Nickel-based superalloys, Ceramic matrix composites, and combinations thereof. In some aspects, outer conductive shell 110 can be electrically coupled to a power source, such as a battery, to provide outer conductive shell 110 potential for conducting current through the surrounding regolith 101.

In some aspects, resistive heater 105 can be electrically isolated from outer conductive shell 110 such that the operation of the resistive heater 105 does not interfere with outer conductive shell 110 when used for ohmic heating. For example, resistive heater 105 is spatially separated from an interior surface of outer conductive shell 110 by cavity 103. In some aspects, first electrode 102 can include an insulative barrier, such as insulative powder 104 filling cavity 103 between resistive heater 105 and outer conductive shell 110. Insulative powder 104 electrically isolates outer conductive shell 110 from a heating element (e.g., a resistive heating wire 108) of resistive heater 105.

In some aspects, resistive heater 105 of first electrode 102 can include a resistive heating wire 108 wrapped around an insulative core 106. Resistive heating wire 108 is coiled-shaped to increase the power density of resistive heater 105 relative to the given height of outer conductive shell 110. Resistive heating wire 108 can be formed of any material suitable for converting electrical current into heat. For example, in some aspects, resistive heating wire 108 is formed of a material selected from a group consisting of tungsten, tantalum, hafnium, niobium, molybdenum, titanium-zirconium-molybdenum (tzm) alloy, tungsten-rhenium alloy, molybdenum disilicide, and/or combinations thereof. Insulative core 106 can be cylindrically-shaped and formed of a rigid material suitable for providing support to the resistive heating wire 108 such that resistive heating wire 108 maintains a coil shape. For example, in some aspects, insulative core 106 is formed of a material selected from a group consisting of aluminum oxide, mullite, corundum, mullite-bonded silicon carbide, nitride bonded silicon carbide, magnesium oxide, silicon carbide, graphite, beryllium oxide, calcium oxide, boron nitride, zirconium dioxide, titanium nitride, and/or combinations thereof. Resistive heating wire 108 can be electrically coupled to a power source, such as, for example, a battery and [ ], to regulate the supply of electrical current to resistive heating wire 108.

Second electrode 112 can include the same and/or similar features of first electrode 102. For example, second electrode 112 can an outer conductive shell 120 and a resistive heater 115 disposed in a cavity 113 defined by outer conductive shell 120. Similar to outer conductive shell 110 of first electrode 102, outer conductive shell 120 of second electrode 112 can be electrically conductive to facilitate the flow of electrical current 134 through the surrounding regolith 101 to an adjacent electrode and can be thermally conductive to transfer heat generated by resistive heater 115 to the surrounding regolith 101. In some aspects, outer conductive shell 120 can be formed of a material selected from the group consisting of Molybdenum, Niobium, Hafnium, Tantalum, Tungsten, Inconel, Graphite, Zirconium, Chromium, Silicon carbide, Molybdenum disilicide, Zirconium dioxide, Boron nitride, Aluminum oxide, Silicon nitride, Hafnium carbide, Zirconium carbide, Zirconium diboride, Nickel-based superalloys, Ceramic matrix composites, and combinations thereof. In some aspects, outer conductive shell 120 can be electrically coupled to a power source, such as a battery, to provide outer conductive shell 120 potential for delivering current and/or receiving current from the surrounding regolith 101. For example, first electrode 102 and second electrode 112 can be set at opposite voltage potentials to allow current to flow from first electrode 102 to second electrode 112 through the regolith 101 located between first electrode 102 and second electrode 112.

In some aspects, resistive heater 115 can be electrically isolated from outer conductive shell 120 such that operation of the resistive heater 115 does not interfere with outer conductive shell 120 when used for ohmic heating. For example, resistive heater 115 is spatially separated from an interior surface of outer conductive shell 120 by cavity 113. In some aspects, second electrode 112 can include an insulative powder 114 filling cavity 113 defined between resistive heater 115 and outer conductive shell 120. Insulative powder 114 electrically isolates outer conductive shell 120 from a heating element (e.g., a resistive heating wire 118) of resistive heater 115.

In some aspects, resistive heater 115 of second electrode 112 can include a resistive heating wire 118 wrapped around an insulative core 116. Similar to heating wire 108 of first electrode 102, resistive heating wire 118 is coil shaped and can be formed of any a material selected from a group consisting of tungsten, tantalum, hafnium, niobium, molybdenum, titanium-zirconium-molybdenum (tzm) alloy, tungsten-rhenium alloy, molybdenum disilicide, and/or combinations thereof. Similar to insulative core 106 of first electrode 102, insulative core 116 provides support for resistive heating wire 118 and can be formed of a material from a group consisting of aluminum oxide, mullite, corundum, mullite-bonded silicon carbide, nitride bonded silicon carbide, magnesium oxide, silicon carbide, graphite, beryllium oxide, calcium oxide, boron nitride, zirconium dioxide, titanium nitride, and/or combinations thereof. Resistive heating wire 118 can be electrically coupled to a power source, such as, for example, a battery, a transformer, a converter, or a controller, to regulate the supply of electrical current to resistive heating wire 118.

In operation, the resistive heaters 105 and 115 generate and transfer heat through insulative powders 104, 114 and outer conductive shells 110, 120 to the surrounding regolith 101, thereby melting regolith 101 to form a molten pool 130 containing ions 132. When molten pool 130 is formed, device 100 shuts off resistive heaters 105 and 115 and initiates ohmic heating by conducting current 134 through outer shell 110 of first electrode 102, ions 132 of molten pool 130, and outer electrode 120 of second electrode 112, thereby maintaining the temperature of molten pool 130 to a desirable temperature for grading or contouring regolith 101. For example, first and second electrodes 102, 112 can be configured to use ohmic heating to heat regolith to a temperature in a range from 1000° C. to 2000° C. Ohmic heating by first and second electrodes 102, 112 creates a volumetric heating effect throughout molten pool 130 and reduces heat loss caused by overheating of internal components, thereby prolonging the operability of resistive heater 105. In some aspects, electrodes 102 and 112 can be advanced (e.g., by a gantry) toward the forward edge of molten pool 130, thereby advancing the molten pool 130 further along the depth of regolith 101. Ultimately, molten pool 130 can solidify upon cooling to form a strong, concrete-like pad suitable for spacecraft launching and landing.

Figure 2:
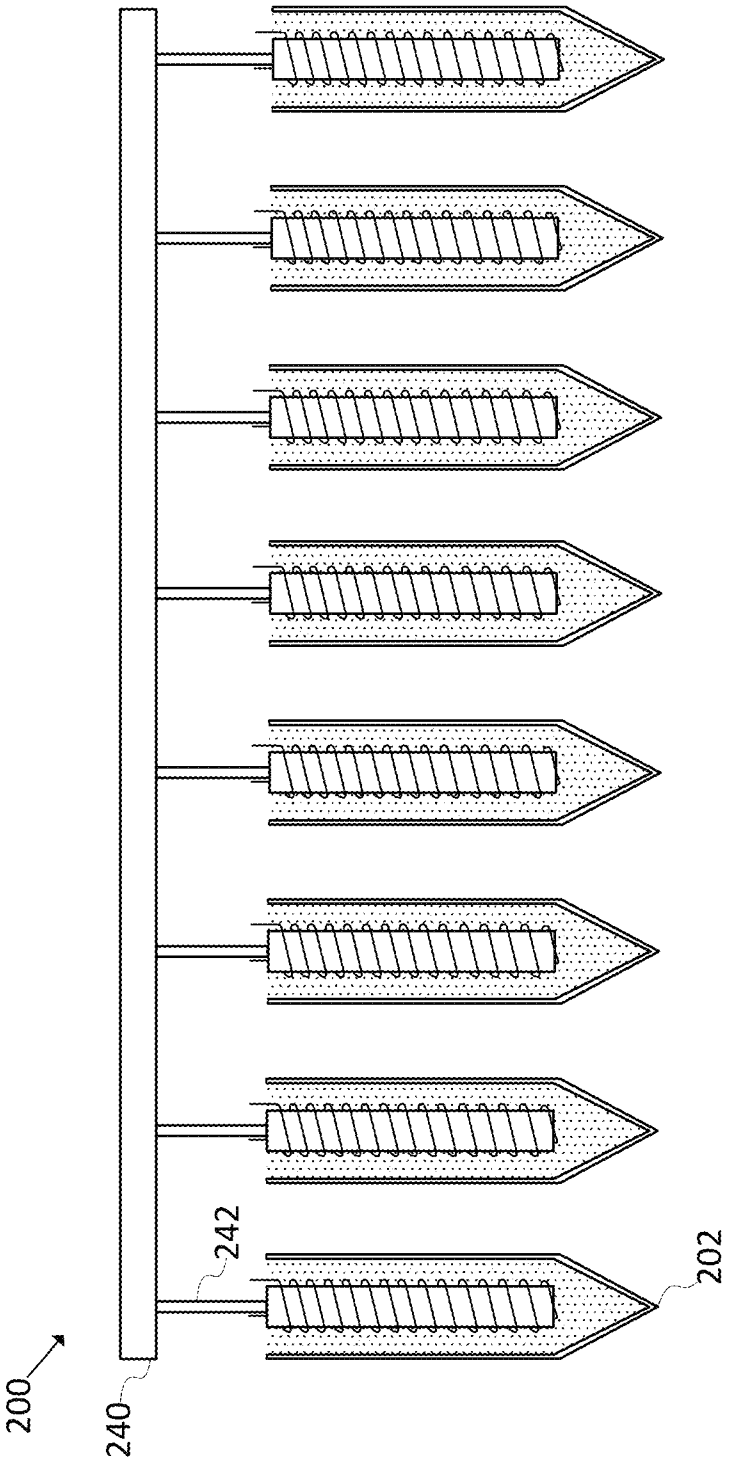
FIG. 2 is a cross-sectional view of a plurality of the electrodes attached to a gantry.

In some aspects, device 100 can include a gantry configured to hold first and second electrodes 102 and 112. The gantry is configured to lower first second electrodes 102 and 112 along the depth of regolith 101 such that electrodes 102 and 112 transfer heat to unheated portions of regolith 101 located beneath molten pool 130. Gantry can include one or more bars, beams, legs, struts and/or combination thereof to hold the plurality of electrodes. For example, as shown in FIG. 2, a device 200 includes a gantry 240 having a horizontal beam with a plurality of bars 242 attached to the plurality of electrodes 202 (same or similar to electrode 102) such that the plurality of electrodes 202 are held in a vertical position. Gantry 240 can be dragged by a vehicle or a machine (e.g., rover, robotic arm, or similar) along the regolith to melt the regolith. By creating a wide molten pool, device 200 shown in FIG. 2 can be used to create roads, landing pads, foundations, or even to mitigate dust.

Figure 3:
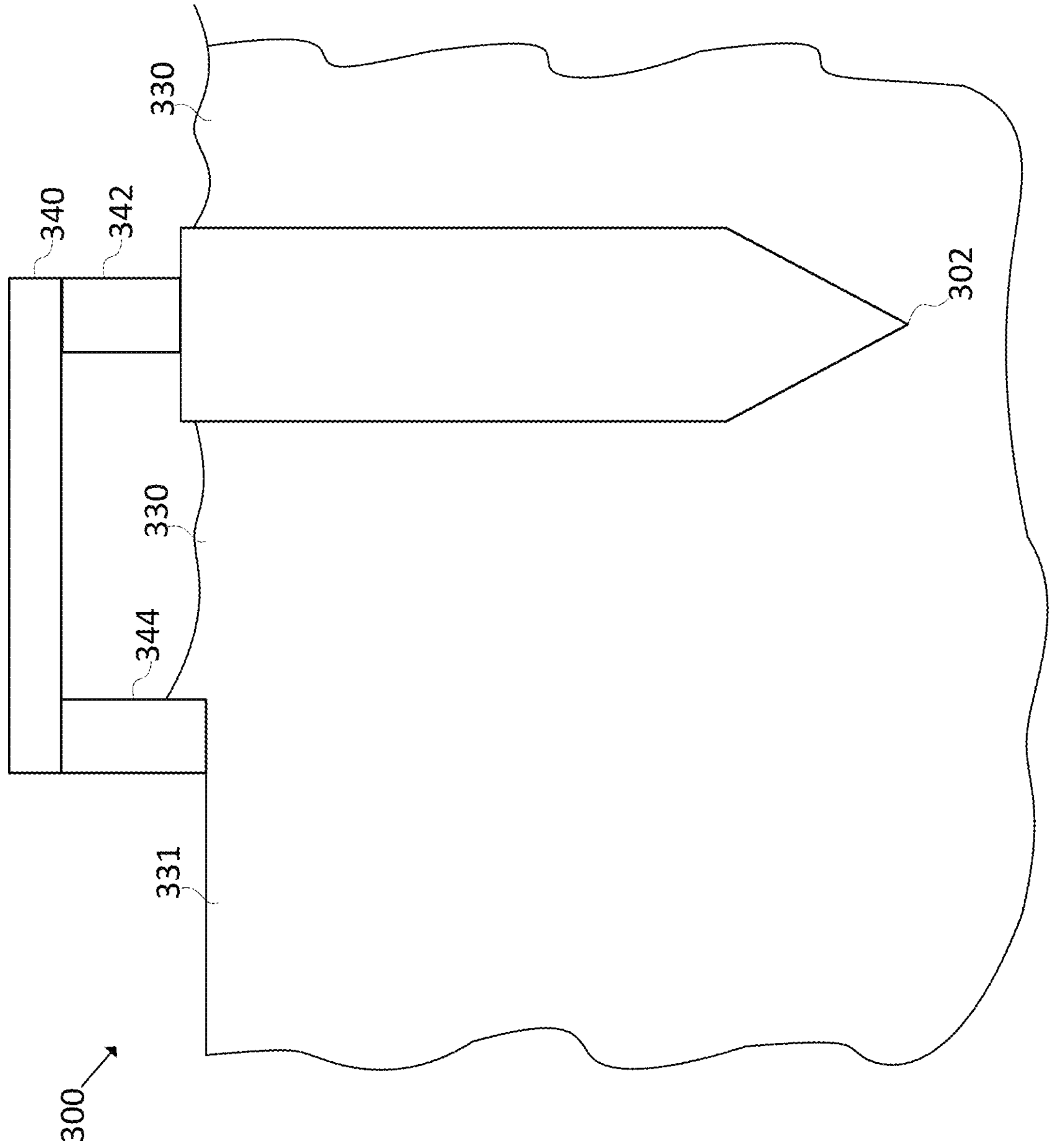
FIG. 3 is a side view of an electrode attached to a gantry with a horizontal arm.

In some aspects, the gantry of device can hold one or more electrodes and a horizontal arm to smooth the surface of the molten pool. For example, as shown in FIG. 3, a device 300 can include a gantry 340 having a beam with one or more bars 342 coupled to a front end of the beam and a horizontal bar 344 coupled to a back end of the beam. Bars 342 can be attached to the plurality of the electrodes 302, which include the same or similar features of electrodes 102, to create a molten pool 330. Trailing the plurality of electrodes 302, horizontal bar 344 is configured to smooth, such as leveling and compacting, the molten pool 330, as gantry 340 towed by a vehicle, to create a flat pool 331 that after cooling provides a flat surface for landing pads, roads, or foundations. In some aspects, horizontal bar 344 can be plate-shaped to level and compact molten pool 330. In some aspects, gantry 340 can include an actuator to apply downward force on bars 342 to drive the plurality of electrodes 302 further along the depth of the regolith. In some aspects, the weight of a self-propelled vehicle mounted to gantry 340 can be used to apply force on bars 342 to drive the plurality of electrodes 302 further along the depth of the regolith.

Figure 4B:
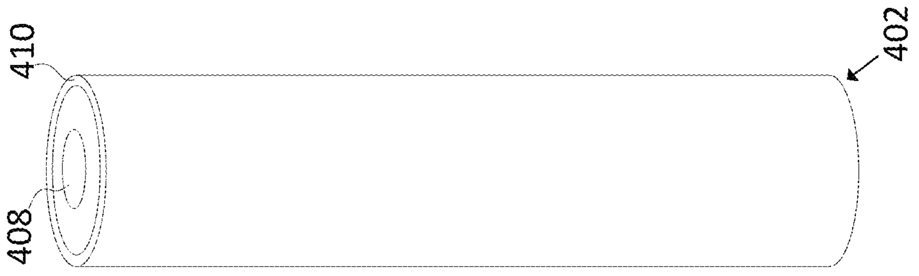
FIG. 4B is an isometric diagram of an electrode.
Figure 4A:
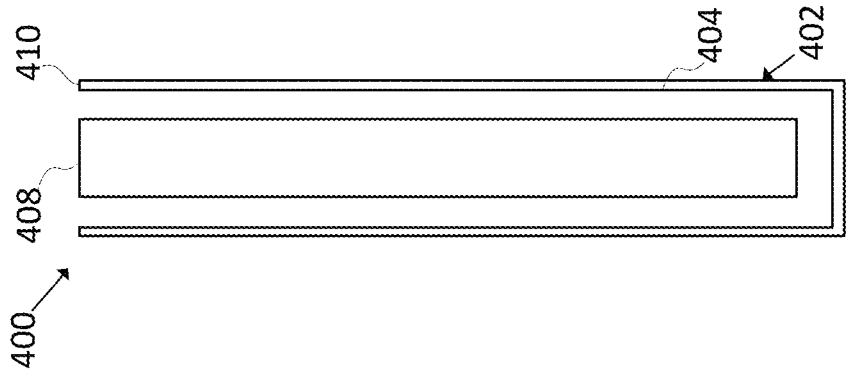
FIG. 4A is a cross-sectional view of an electrode taken along broken line 4-4 of FIG. 4B.

FIGS. 4A and 4B show a device 400 including an electrode 402 configured to melt regolith according to aspects of the present disclosure. Electrode 402 can include the same or similar features of electrode 102 shown in FIG. 1. For example, electrode 402 can include a resistive heater 408 and an outer conductive shell 410. Electrode 402 can include an insulative barrier 404 defined between resistive heater 408 and outer conductive shell 410 to electrically isolate outer conductive shell 410 from resistive heater 408. In some aspect, insulative barrier 404 is a vacuum that electrically isolates the outer conductive shell 410 from resistive heater 408.

Figure 5A:
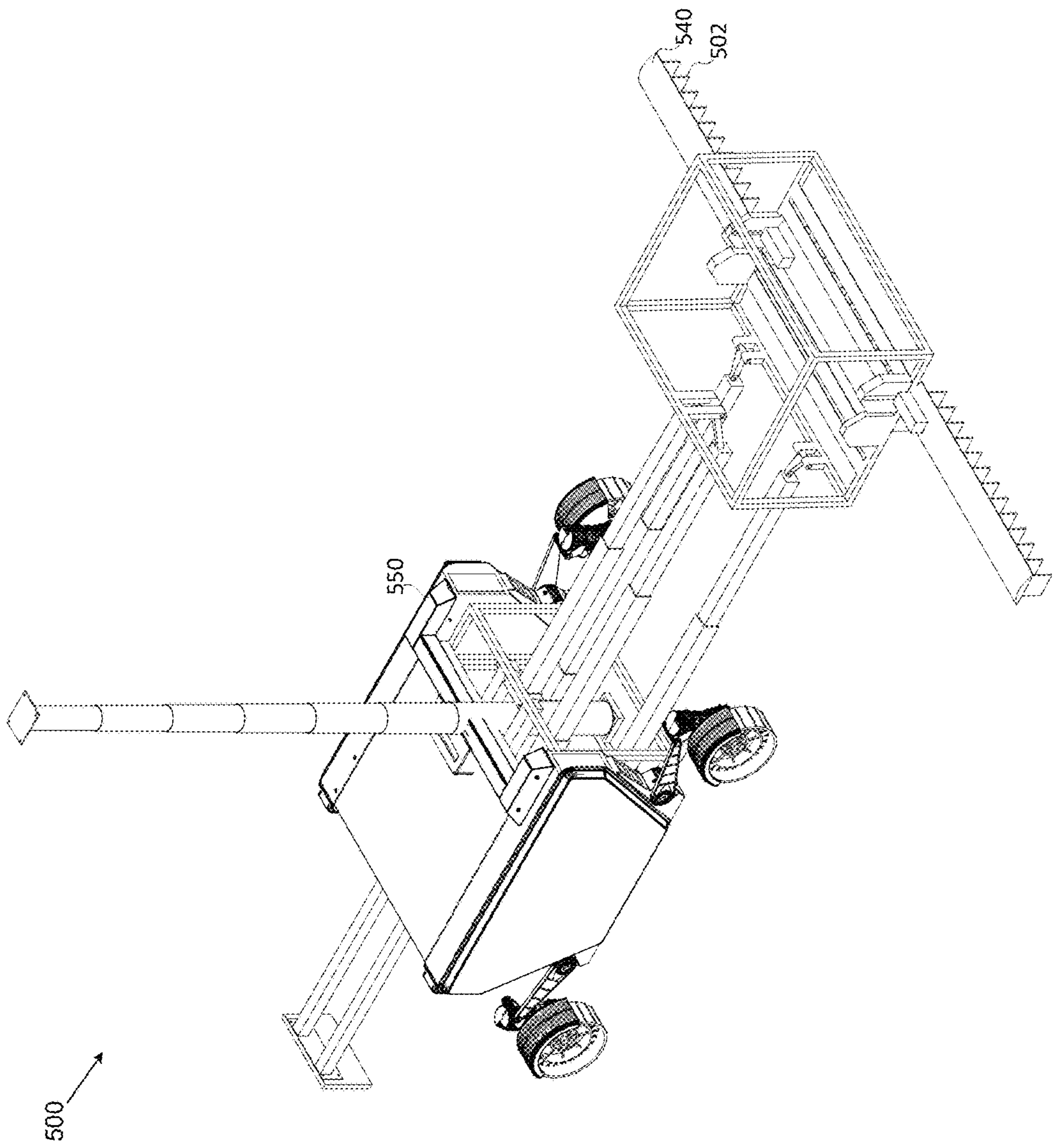
FIG. 5A is a back, top, left side isometric view of a rover towing a gantry with electrodes.
Figure 5B:
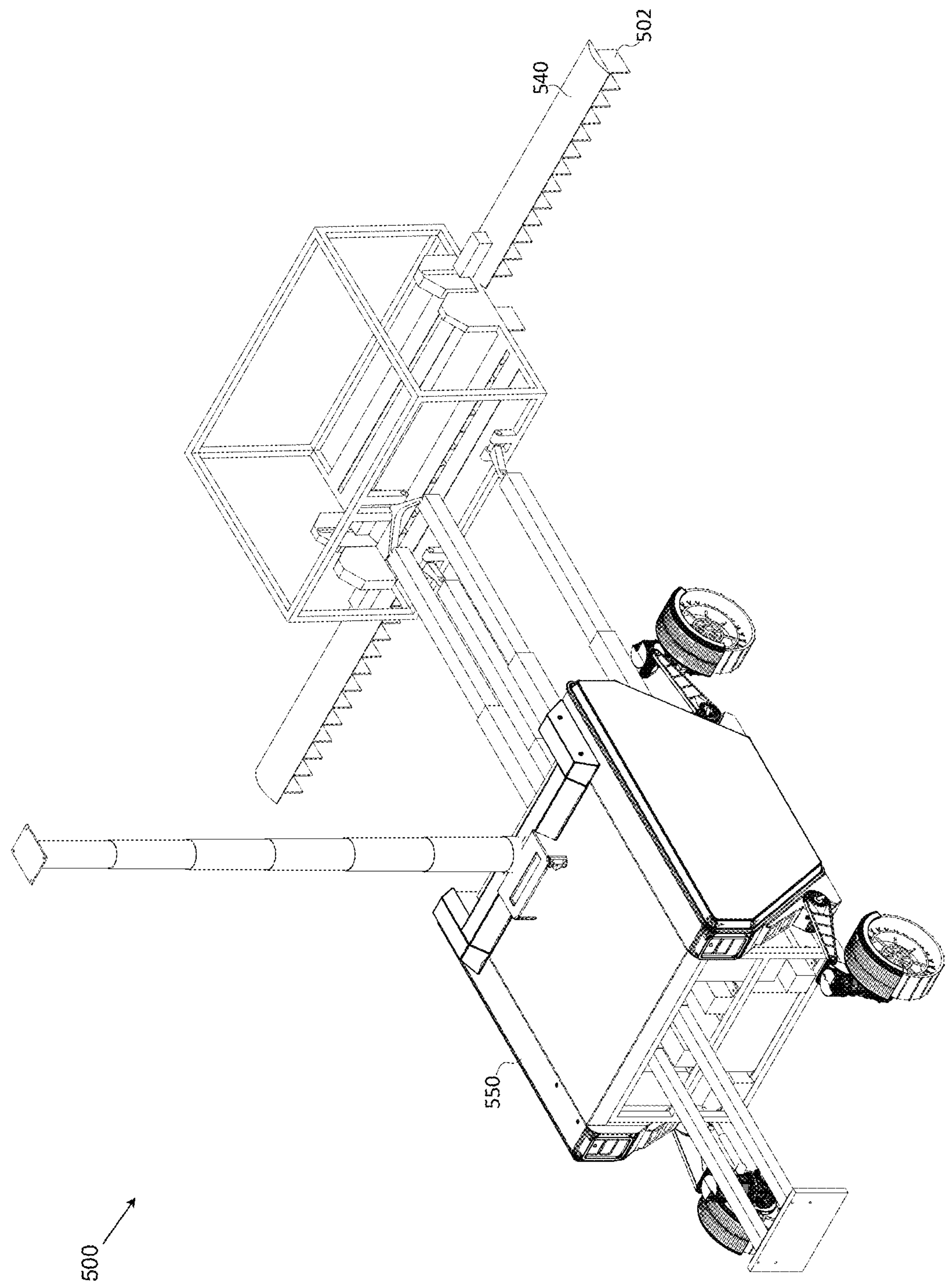
FIG. 5B is a front, top, left side isometric view of the rover, gantry and electrodes of FIG. 5A.
Figure 5D:
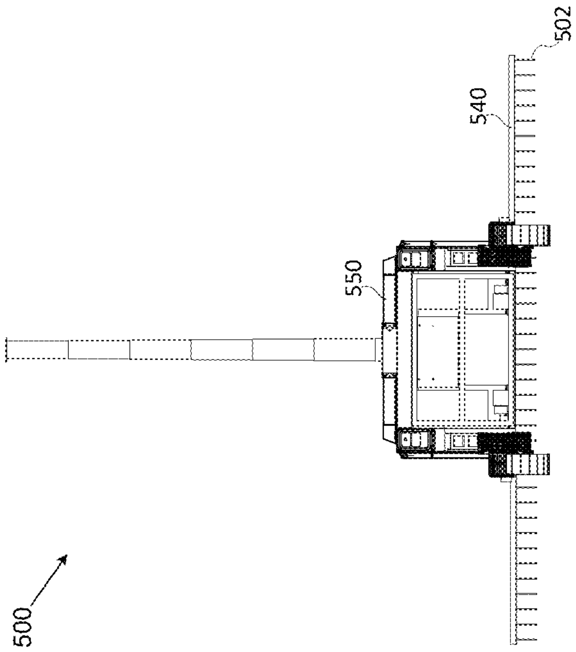
FIG. 5D is a front view of the rover, gantry and electrodes shown in FIG. 5A.
Figure 5C:
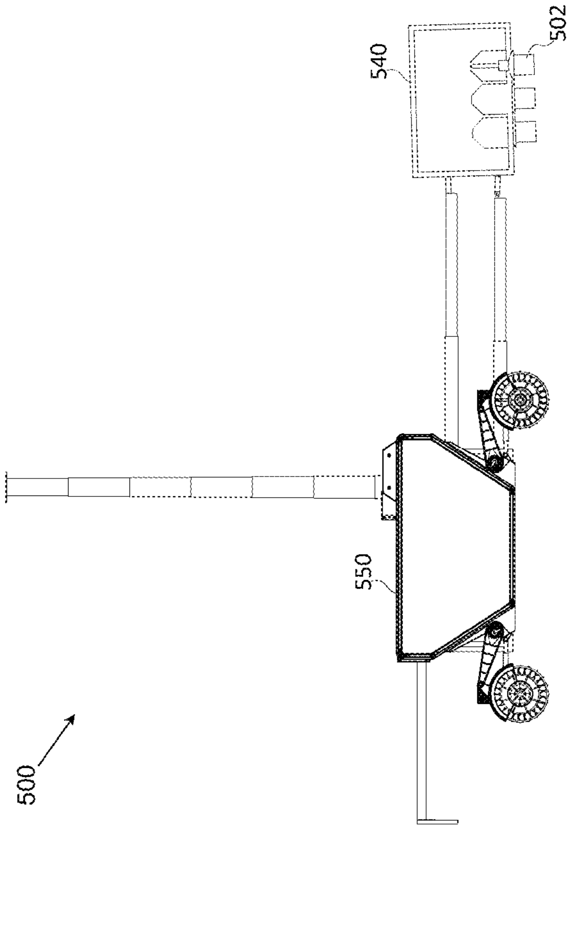
FIG. 5C is a left side of the rover, gantry and electrodes shown in FIG. 5A.
Figure 5E:
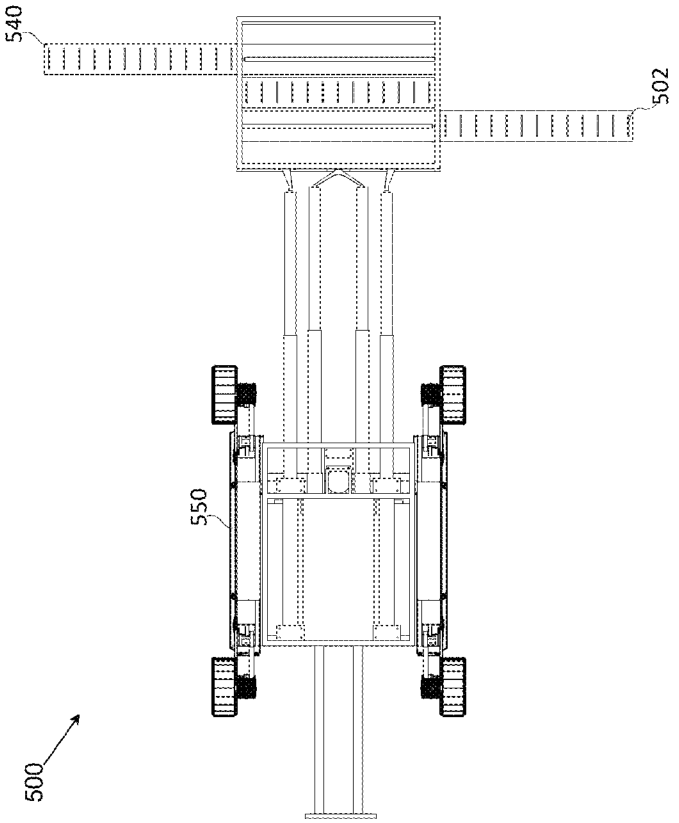
FIG. 5E is a bottom view of the rover, gantry and electrodes shown in FIG. 5A.

With reference to FIGS. 5A-5E, a system 500 can include a self-propelled vehicle, such as a rover 550, towing a gantry 540 attached to a plurality of electrodes 502. Rover 550 can include a chassis 552 supported by a plurality of wheels 554 configured to propel rover 550 along the regolith. In some aspects, rover 550 can include a power source, such as a battery, solar panels, nuclear power source, or similar, electrically coupled to one or more components (e.g., resistive heater and outer conductive shell) of electrodes 502. In some aspects, rover 550 can include a controller and one or more sensors (e.g., thermocouples, current sensors, voltage sensors) to monitor the temperature of the treated regolith and the energy output of the power source. The controller can adjust the energy output of the power source based on the temperature measurements of the treated regolith. In some aspects, gantry 540 can include a frame 542 mounted to chassis 552 of rover 550 via one or more tow arms 556. Gantry 540 can include one or more horizontal beams 544 extending outward in a lateral direction X (shown in FIG. 5E) from and underneath frame 542. The plurality of electrodes 502 can be attached to a bottom surface of horizontal beams 544 of gantry 540. In some aspects, as shown in FIG. 5E, horizontal beams 544 can be offset with respect to each other along a longitudinal direction Y.

Figure 7:
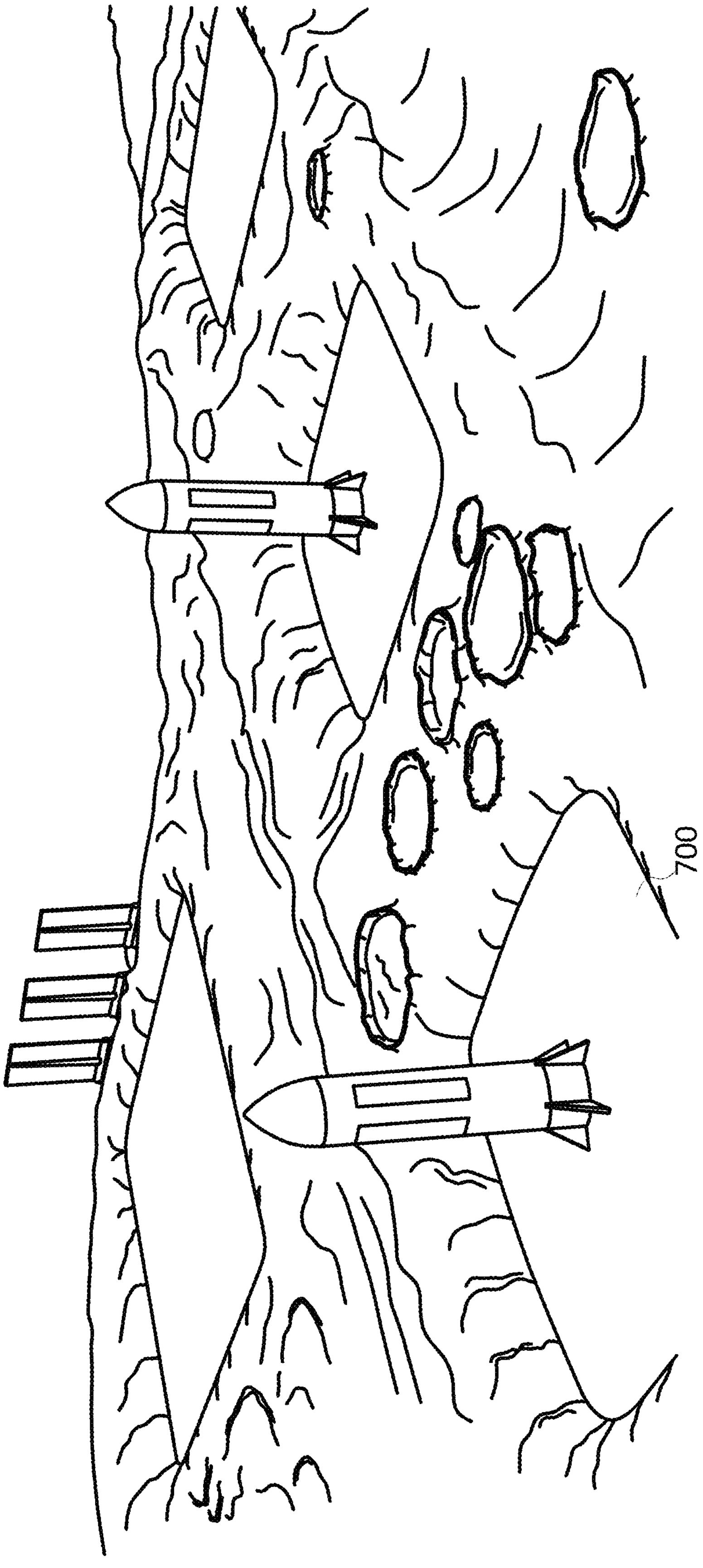
FIG. 7 shows a launching pad constructed from the devices, systems, and methods described herein.

In some aspects, each of electrodes 502 can include the same or similar features of electrodes 102 and 112. For example, each of electrodes 502 can include a resistive heater capable of heating the electrodes 502. Each of electrodes 502 can include an outer conductive shell configured to transfer heat generated by the resistive heater and conduct electricity to the surrounding regolith. Each of electrodes 502 includes an intermediate barrier (e.g., powder or air) between the resistive heater and the outer conductive shell to electrically insulate the outer conductive shell from the resistive heater Rover 550, gantry 540, and electrodes 502 can be configured to make a road, landing pad, or building foundation, such as a launch pad 700 shown in FIG. 7. Before starting the heating operation, gantry 540 holds the electrodes 502 above the surface of the regolith. In some aspects, at the beginning of the heating operation, each of the electrodes 502 are heated by their resistive heaters until they are hot enough to melt the regolith, such as, for example, in a temperature range from 1000° C. to 2000° C. At this point, the electrodes 502 are lowered by gantry 540 to make contact with the regolith. In some aspects, gantry 540 can include one or more actuators, such as a hydraulic cylinder with a sliding piston or an electric motor with moveable linkages, to move electrodes 502 downward. Gantry 540 lowers electrodes 502 as quickly as the regolith melts. In some aspects, electrodes 502 are configured to melt the regolith in a time range from 1 minute to 10 hours, for example, such as from 3 minutes to 2 hours. Once a molten pool is created and electrodes 502 are lowered into the molten pool, the controller switches from the resistive heating stage to the ohmic heating stage of the heating operation, for example, by turning off the resistive heater of electrodes 502 and setting electrodes to an ohmic heating mode. During the ohmic heating stage of the heating operation, the outer conductive shells of electrodes 502 conduct electrical current through the molten pool. The current phase conducted by each of electrodes 502 alternates such that electricity is conducted from the outer conductive shells through the ions of the molten pool to the outer conductive shell of an adjacent electrode. The heat energy generated by the electrical current conducted between adjacent electrodes (ohmic heating) is transferred to the molten pool. While electrodes 502 generate ohmic heating, rover 550 traverses the regolith surface, pulling gantry 540 forward. As electrodes 502 approach the edge of the molten pool by the towing of rover 550, the molten pool expands forward. In some aspects, electrodes 502 can be blade-shaped and can be pulled into the edge of the molten pool. As electrodes 502 are heated (the outer shells act as secondary resistive heaters by the nature of their conducting electricity), electrodes 502 melt the edge of the regolith both by secondary resistive heat and further ohmic heat.

In some aspects, the controller can start the resistive heaters of electrodes 502 during any instance of the ohmic heating stage of the heating operation, particularly when additional heat capacity is needed, such as encountering buried rocks or incurring unexpected drops in power supply. After completion of the heating operation, gantry 540 moves electrodes 502 upward out of the regolith. In some aspects, gantry 540 can include one or more actuators, such as a hydraulic cylinder with a sliding piston or an electric motor with moveable linkages, to move electrodes 502 upward. When electrodes 502 are retracted from the regolith, the controller can start the resistive heaters of the electrodes to promote removal of any debris or slough sticking to the outer conductive shell of electrodes 502.

The example devices and systems described above are capable of being used on any rocky body in the solar system, including but not limited to the Earth, the Moon, Mars, rocky moons, and even some asteroids and comets.

Figure 6:
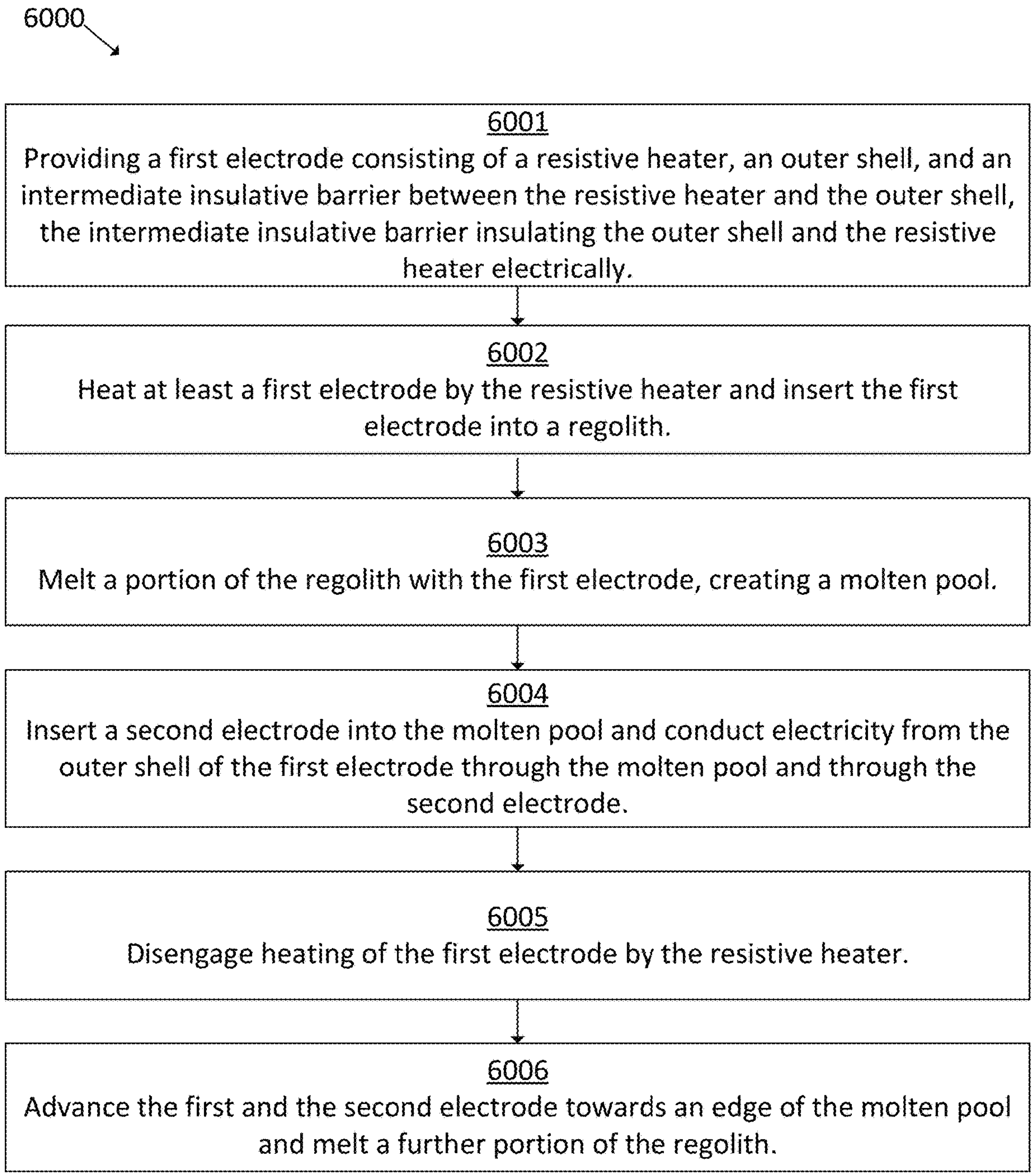
FIG. 6 is a block diagram showing aspects of a method for melting regolith.

FIG. 6 shows an example block diagram illustrating aspects of a method 6000 for melting regolith. Method 6000 may be implemented using devices and systems 100, 200, 300, 400, or 500 described herein. Method 6000 can be implemented with any other combination of components suitable for melting regolith.

In some aspects, method 6000 can include a step 6001 of providing a first electrode consisting of a resistive heater, an outer shell, and an intermediate insulative barrier between the resistive heater and the outer shell, the intermediate insulative barrier insulating the outer shell and the resistive heater electrically. For example, in a manner such as described above with reference to FIG. 1, as in first electrode 102 including resistive heater 105, insulative barrier 104, and outer conductive shell 110.

In some aspects, method 6000 can include a step 6002 of heating at least the first electrode by using the resistive heater, such as resistive heater 105, and inserting the first electrode into a regolith by using a gantry, such as gantry 240.

In some aspects, method 6000 can include a step 6003 of melting a portion of the regolith with the first electrode, such as electrode 102, to create a molten pool, such as molten pool 130.

In some aspects, method 6000 can include a step 6004 of inserting a second electrode, such as second electrode 112, into the molten pool, such as molten pool 130, and conducting electricity from the outer conductive shell of the first electrode, such as outer conductive shell 110 of first electrode 102, through the molten pool and through the outer conductive shell of the second electrode, such as outer conductive shell 120 of second electrode 112.

In some aspects, method 6000 can include a step 6005 of disengaging heating of the first electrode, such as first electrode 102, by terminating operation of the resistive heater, such as resistive heater 105.

In some aspects, method 6000 can include a step 6006 of advancing the first and the second electrodes, such as first and second electrodes 102, 112, towards an edge of the molten pool, such as molten pool 130, and melting a further portion of the regolith. In some aspects, step 606 can include using gantry 340 to move electrode 302 toward the edge of molten pool 330.

In some examples, the electrodes' resistive heaters are reengaged before withdrawing the electrodes from the molten regolith to prevent damage to the electrodes by shock.

In some examples, the electrical current conducted between the adjacent electrodes is alternating current. In some examples, the electrical current conducted between the adjacent electrodes is direct current, and the regolith reacts electrolytically to the direct current to produce oxygen.

In some examples, the outer conductive shell of the electrodes is formed of a material selected from the group consisting of Molybdenum, Niobium, Hafnium, Tantalum, Tungsten, Inconel, Graphite, Zirconium, Chromium, Silicon carbide, Molybdenum disilicide, Zirconium dioxide, Boron nitride, Aluminum oxide, Silicon nitride, Hafnium carbide, Zirconium carbide, Zirconium diboride, Nickel-based superalloys, Ceramic matrix composites, and combinations thereof.

In some examples, the intermediate insulative barrier is selected from the group consisting of magnesium oxide, aluminum oxide, beryllium oxide, thorium oxide, calcium oxide, strontium oxide, chromium oxide, zinc oxide, barium oxide, cobalt oxide, indium oxide, titanium dioxide, manganese oxide, zirconium dioxide, diamond, graphite, boron nitride, vacuum, a powder, a sintered solid, and combinations thereof.

In some examples, the resistive heater comprises a material selected from the group consisting of tungsten, tantalum, hafnium, niobium, molybdenum, titanium-zirconium-molybdenum (tzm) alloy, tungsten-rhenium alloy, molybdenum disilicide, and combinations thereof.

In some examples, the resistive heater wraps around an insulative core, and the core is formed from a material selected from the group consisting of aluminum oxide, mullite, corundum, mullite-bonded silicon carbide, nitride bonded silicon carbide, magnesium oxide, silicon carbide, graphite, beryllium oxide, calcium oxide, boron nitride, zirconium dioxide, titanium nitride, and combinations thereof.

The invention has been described with reference to various specific and preferred embodiments and techniques. Nevertheless, it is understood that many variations and modifications may be made while remaining within the spirit and scope of the invention.

The invention claimed is:

1. A device for melting regolith, comprising:

a first electrode configured to melt regolith and conduct electricity, comprising:

a resistive heater configured to heat the first electrode;

an outer shell configured to conduct heat and electricity;

an intermediate insulative barrier between the resistive heater and the outer shell configured to insulate the outer shell and the resistive heater electrically;

a second electrode configured to conduct electricity; and a gantry configured to hold the first and second electrodes, lower the first and second electrodes into the regolith, and advance the first and second electrodes through the regolith;

the first and second electrodes configured to conduct electricity through molten regolith.

2. The device of claim 1, wherein the second electrode is further configured to melt regolith and the second electrode further comprises:

a second resistive heater configured to heat the second electrode;

a second outer shell configured to conduct heat and electricity; and a second intermediate insulative barrier between the second resistive heater and the second outer shell configured to insulate the second outer shell and the second resistive heater electrically.

3. The device of claim 1, wherein the outer shell comprises a material selected from the group consisting of molybdenum, niobium, hafnium, tantalum, tungsten, Inconel, graphite, zirconium, chromium, silicon carbide, molybdenum disilicide, zirconium dioxide, boron nitride, aluminum oxide, silicon nitride, hafnium carbide, zirconium carbide, zirconium diboride, nickel-based superalloys, ceramic matrix composites, and combinations thereof.

4. The device of claim 1, further comprising a horizontal bar configured to smooth the molten regolith.

5. The device of claim 1, wherein the outer electrode comprises a horizontal cross-section of a blade and the outer electrode is configured to press against and penetrate the regolith while creating the molten regolith.

6. The device of claim 1, wherein the intermediate insulative barrier is selected from the group consisting of magnesium oxide, aluminum oxide, beryllium oxide, thorium oxide, calcium oxide, strontium oxide, chromium oxide, zinc oxide, barium oxide, cobalt oxide, indium oxide, titanium dioxide, manganese oxide, zirconium dioxide, diamond, graphite, boron nitride, vacuum, a powder, a sintered solid, and combinations thereof.

7. The device of claim 1, wherein the resistive heater comprises a material selected from the group consisting of tungsten, tantalum, hafnium, niobium, molybdenum, titanium-zirconium-molybdenum (tzm) alloy, tungsten-rhenium alloy, molybdenum disilicide, and combinations thereof.

8. The device of claim 1, wherein the resistive heater wraps around an insulative core, and wherein the core is selected from the group consisting of aluminum oxide, mullite, corundum, mullite-bonded silicon carbide, nitride bonded silicon carbide, magnesium oxide, silicon carbide, graphite, beryllium oxide, calcium oxide, boron nitride, zirconium dioxide, titanium nitride, and combinations thereof.

9. A system for melting regolith, comprising:

a first electrode configured to melt regolith and conduct electricity, the first electrode comprising:

a resistive heater configured to heat the first electrode;

an outer shell configured to conduct heat and electricity;

an intermediate insulative barrier between the resistive heater and the outer shell configured to insulate the outer shell and the resistive heater electrically;

a second electrode configured to conduct electricity;

a gantry to traverse terrain, the terrain comprising the regolith, and the gantry further configured to carry the first electrode and the second electrode, insert and remove the first and second electrodes into the regolith to melt the regolith, and to traverse with the first and second electrodes through molten regolith;

the first and second electrodes configured to conduct electricity through the molten regolith.

10. The system of claim 9, wherein the second electrode is further configured to melt the regolith and further comprises:

a second resistive heater configured to heat the second electrode;

a second outer shell configured to conduct heat and electricity; and a second intermediate insulative barrier between the second resistive heater and the second outer shell configured to insulate the second outer shell and the resistive heater electrically.

11. The system of claim 9, wherein the gantry is mounted to a rover, the rover configured to drag the gantry across the terrain.

12. The system of claim 9, wherein the terrain is selected from the group consisting of the Earth, Moon, Mars, an asteroid, a comet, and another outer space object.

13. A method for melting regolith, comprising:

providing a first electrode comprising a resistive heater, an outer shell, and an intermediate insulative barrier between the resistive heater and the outer shell, the intermediate insulative barrier insulating the outer shell and the resistive heater electrically;

heating at least a first electrode by the resistive heater and inserting the first electrode into a regolith;

melting a portion of the regolith with the first electrode to create a molten pool;

inserting a second electrode into the molten pool and conducting electricity from the outer shell of the first electrode through the molten pool and through the second electrode; and advancing the first and the second electrodes towards an edge of the molten pool and melting a further portion of the regolith.

14. The method of claim 13, further comprising melting a portion of the regolith with the second electrode, the second electrode further comprising:

a second resistive heater heating the second electrode;

a second outer shell conducting heat and electricity;

a second intermediate insulative barrier between the second resistive heater and the second outer shell insulating the second outer shell and the second resistive heater electrically.

15. The method of claim 13, wherein upon conducting electricity from the first electrode through the molten pool and through the second electrode, disengaging heating of the first electrode by the resistive heater.

16. The method of claim 15, further comprising reengaging heating of the first electrode by the resistive heater before removing the first electrode from the molten pool.

17. The method of claim 13, wherein the electricity is alternating current.

18. The method of claim 13, wherein the electricity is direct current, the method further comprising reacting the regolith electrolytically by the direct current to produce oxygen.

19. The method of claim 13, further comprising directing the molten pool to propagate to create a road, a landing pad, or a foundation.

* * * * *